(12) United States Patent
Mori

(10) Patent No.: US 11,518,193 B2
(45) Date of Patent: Dec. 6, 2022

(54) TIRE STEEL CORD AND PNEUMATIC TIRE USING SAME

(71) Applicant: BRIDGESTONE CORPORATION, Tokyo (JP)

(72) Inventor: Yuriko Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 977 days.

(21) Appl. No.: 16/323,046

(22) PCT Filed: Jul. 27, 2017

(86) PCT No.: PCT/JP2017/027336
§ 371 (c)(1),
(2) Date: Feb. 4, 2019

(87) PCT Pub. No.: WO2018/025753
PCT Pub. Date: Feb. 8, 2018

(65) Prior Publication Data
US 2019/0202240 A1 Jul. 4, 2019

(30) Foreign Application Priority Data
Aug. 5, 2016 (JP) .............................. JP2016-154983

(51) Int. Cl.
*B60C 9/00* (2006.01)
*D07B 1/06* (2006.01)

(52) U.S. Cl.
CPC .............. *B60C 9/0007* (2013.01); *B60C 9/00* (2013.01); *D07B 1/06* (2013.01); *D07B 1/062* (2013.01);
(Continued)

(58) Field of Classification Search
CPC ........ D07B 1/062; B60C 9/007; B60C 9/0007
See application file for complete search history.

(56) References Cited

U.S. PATENT DOCUMENTS 3,336,744 A * 8/1967 Peene .................... D07B 1/062
57/902
3,762,145 A * 10/1973 Kikuchi ................ B60C 9/0007
57/902
(Continued)

FOREIGN PATENT DOCUMENTS

CN 102471998 A 5/2012
EP 0 501 720 A1 9/1992
(Continued)

OTHER PUBLICATIONS

International Search Report for PCT/JP2017/027336 dated Oct. 24, 2017 [PCT/ISA/210].
(Continued)

*Primary Examiner* — Shaun R Hurley
(74) *Attorney, Agent, or Firm* — Sughrue Mion, PLLC

(57) ABSTRACT

Provided are: a tire steel cord having not only excellent cutting resistance and corrosion resistance but also excellent processability in plant; and a pneumatic tire including the same. The tire steel cord has a layer-twisted structure including: a core 11 composed of two core filaments 1; and a sheath 12 composed of eight sheath filaments 2 that are twisted together around the core 11, in which tire steel cord the two core filaments 1 constituting the core 11 are twisted together, the twisting direction of the core filaments 1 and that of the sheath filaments 2 are different, and a diameter (Dc) of the core filaments 1 and a diameter (Ds) of the sheath filaments 2 satisfy a relationship represented by the following Equation (1):

$$0.90 \leq Ds/Dc \leq 1.10 \qquad (1).$$

19 Claims, 3 Drawing Sheets

(52) U.S. Cl.
CPC .................. *D07B 2201/203* (2013.01); *D07B 2201/2006* (2013.01); *D07B 2201/2051* (2013.01); *D07B 2201/2061* (2013.01); *D07B 2401/206* (2013.01); *D07B 2401/208* (2013.01)

(56) References Cited

U.S. PATENT DOCUMENTS

| | | | |
|---|---|---|---|
| 4,690,191 | A | 9/1987 | Kawasaki |
| 5,024,261 | A | 6/1991 | Igarashi et al. |
| 5,213,640 | A | 5/1993 | Ikehara |
| 5,311,917 | A | 5/1994 | Ikehara et al. |
| 5,598,693 | A | 2/1997 | Yanagisawa et al. |
| 5,706,641 | A * | 1/1998 | Ishizaka ................ D07B 1/062 57/902 |
| 5,765,355 | A | 6/1998 | Yanagisawa et al. |
| 6,365,273 | B1 * | 4/2002 | Baillievier ............ D07B 1/148 428/377 |
| 6,425,428 | B1 * | 7/2002 | Onuma ................ D07B 7/025 57/902 |
| 8,033,311 | B2 * | 10/2011 | Alvarez ................ B60C 15/04 152/550 |
| 2001/0013385 | A1 * | 8/2001 | Ohya ................ B60C 9/0007 152/209.18 |
| 2008/0066843 | A1 | 3/2008 | Alvarez et al. |
| 2009/0260735 | A1 | 10/2009 | Sasabe et al. |
| 2012/0174557 | A1 | 7/2012 | Boisseau et al. |
| 2015/0068655 | A1 | 3/2015 | Jung et al. |

FOREIGN PATENT DOCUMENTS

| | | |
|---|---|---|
| JP | 61-206695 U | 12/1986 |
| JP | 63-235587 A | 9/1988 |
| JP | 2-154086 A | 6/1990 |
| JP | 2-306801 A | 12/1990 |
| JP | 4-193605 A | 7/1992 |
| JP | 9-143890 A | 6/1997 |
| JP | 11-081166 A | 3/1999 |
| JP | 2000-008282 A | 1/2000 |
| JP | 2001-234486 A | 8/2001 |
| JP | 2007-537083 A | 12/2007 |
| JP | 2015-052192 A | 3/2015 |

OTHER PUBLICATIONS

Search Report dated Mar. 31, 2020, from China National Intellectual Property Administration in Application No. 201780046707.8.
Communication dated Apr. 23, 2019 from European Patent Office in counterpart EP Application No. 17836859.3.

* cited by examiner

TIRE STEEL CORD AND PNEUMATIC TIRE USING SAME

CROSS REFERENCE TO RELATED APPLICATIONS

This application is a National Stage of International Application No. PCT/JP2017/027336, filed on Jul. 27, 2017, which claims priority from Japanese Patent Application No. 2016-154983, filed on Aug. 5, 2016.

TECHNICAL FIELD

The present invention relates to a tire steel cord, and a pneumatic tire including the same (hereinafter, also simply referred to as "steel cord" and "tire", respectively). More particularly, the present invention relates to: a tire steel cord having not only excellent cutting resistance and corrosion resistance but also excellent processability in plant; and a pneumatic tire including the same.

BACKGROUND ART

General dump truck tires running on rough ground on occasions are forced to run on road surfaces on which broken rocks are scattered. Thus, steel cords are widely used as reinforcing materials. Under such circumstances, as a steel cord for truck/bus tires that has excellent belt-end separation resistance and improves the tire durability and retreadability, for example, Patent Document 1 proposes a steel cord which includes a core composed of one to three steel filaments and six to nine steel filaments twisted together around the core and satisfies prescribed physical properties.

RELATED ART DOCUMENT

Patent Document

[Patent Document 1] JPH02-306801A

SUMMARY OF THE INVENTION

Problems to be Solved by the Invention

In dump truck tires, a belt cut failure is likely to occur due to running on rough ground. Thus, in order to improve the resistance against inputs of external damages, namely the cutting resistance, the steel cords used in belt layers are required to have a large shear load. Further, it is conceivable that infiltration of water through a cut damage causes corrosion of the steel cords and this leads to a separation failure. Accordingly, it is necessary to prevent infiltration of water into the steel cords by allowing a rubber to sufficiently permeate into the steel cords. Moreover, when steel cords are used in intersecting belt layers, the steel cords are also required to have sufficient strength such that they can withstand an internal pressure and a load applied thereto. Therefore, a further improvement is desired in those steel cords used in such tires.

In view of the above, an object of the present invention is to provide: a tire steel cord having not only excellent cutting resistance and corrosion resistance but also excellent processability in plant; and a pneumatic tire including the same.

Means for Solving the Problems

The present inventor intensively studied to solve the above-described problems and consequently obtained the following findings. That is, by twisting cores together in a steel cord having a 2+8 structure, the cross-sections of the steel cords are allowed to deform when a cut is input, and the cut input can thereby be mitigated. In conventional steel cords in which the rubber permeation amount (rubber penetration amount) is insufficient, since the forces applied to the outermost sheath adhering with a rubber are concentrated, a crack generated due to belt-end distortion tends to propagate easily. However, by adopting a 2+8 structure and twisting core filaments and sheath filaments, which have the same diameter, in different directions, a sufficient rubber penetration amount is ensured, so that the steel cords as a whole can bear such distortion. Moreover, since the core filaments and the sheath filaments, which have the same diameter, each have the same surface area, distortion can be made more uniform and, by twisting the core filaments and the sheath filaments in different directions, the crack propagation resistance can be improved against strains applied from various directions. Based on these findings, the present inventor further intensively studied to discover that the above-described problems can be solved by adopting the below-described constitution, thereby completing the present invention.

That is, the tire steel cord of the present invention is a tire steel cord having a layer-twisted structure including: a core composed of two core filaments; and a sheath composed of eight sheath filaments that are twisted together around the core, the tire steel cord being characterized in that:

the two core filaments constituting the core are twisted together, the twisting direction of the core filaments and that of the sheath filaments are different, and a diameter (Dc) of the core filaments and a diameter (Ds) of the sheath filaments satisfy a relationship represented by the following Equation (1):

$$0.90 \leq Ds/Dc \leq 1.10 \tag{1}$$

In the steel cord of the present invention, it is preferred that the Dc and the Ds be the same. In the steel cord of the present invention, it is also preferred that the Dc and the Ds be both 0.30 to 0.55 mm. Further, in the steel cord of the present invention, it is preferred that the twisting pitch of the core filaments be 5 to 15 mm. Still further, in the steel cord of the present invention, it is preferred that the twisting pitch of the sheath filaments be 9 to 30 mm. Yet still further, in the steel cord of the present invention, it is preferred that a gap area (S1) of the sheath and a sum (S2) of cross-sectional areas of the sheath filaments satisfy a relationship represented by the following Equation (2):

$$40 \leq S1/S2 \times 100(\%) \leq 120 \tag{2}$$

Yet still further, in the steel cord of the present invention, it is preferred that the gap area (S1) of the sheath be 0.30 mm$^2$ or larger. Yet still further, in the steel cord of the present invention, it is preferred that a strength (F1) of the core filaments and a strength (F2) of the sheath filaments satisfy a relationship represented by the following Equation (3):

$$F1/F2 \times 100 \geq 90(\%) \tag{3}$$

Yet still further, in the steel cord of the present invention, it is preferred that the strength (F2) of the sheath filaments be 150 N or higher.

The pneumatic tire of the present invention is characterized by including the tire steel cord of the present invention.

Effects of the Invention

According to the present invention, a tire steel cord having not only excellent cutting resistance and corrosion resistance but also excellent processability in plant, and a pneumatic tire including the same can be provided.

MODE FOR CARRYING OUT THE INVENTION

Figure 1:
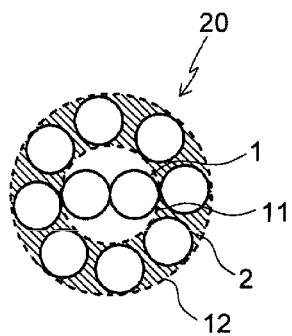
FIG. 1 is a cross-sectional view illustrating a tire steel cord according to one preferred embodiment of the present invention.

The tire steel cord and pneumatic tire according to the present invention will now be described in detail referring to the drawings. FIG. 1 is a cross-sectional view illustrating a tire steel cord according to one preferred embodiment of the present invention. As illustrated, a steel cord 20 of the present invention has a layer-twisted structure including: a core 11 composed of two core filaments 1; and a sheath 12 composed of eight sheath filaments 2 that are twisted together around the core 11. In the steel cord 20 of the present invention, the two core filaments 1 constituting the core 11 are twisted together. By adopting this constitution, the steel cord 20 of the present invention has superior cutting resistance as compared to a conventional steel cord in which three core filaments are twisted together. The reasons for this are described below.

Figure 2:
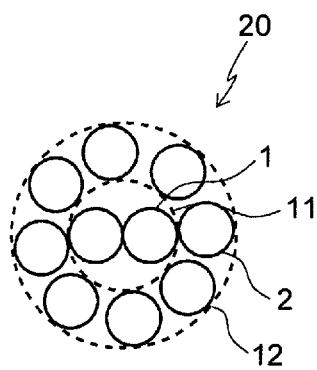
FIG. 2A is a cross-sectional view illustrating a tire steel cord prior to a cut input according to one preferred embodiment of the present invention.
FIG. 2B is a cross-sectional view illustrating a tire steel cord when a cut input is made according to one preferred embodiment of the present invention.
Figure 2:
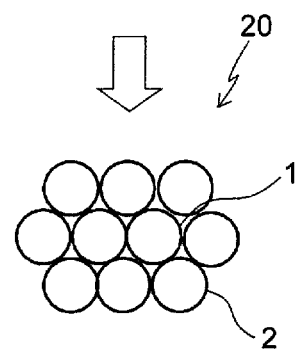
Figure 3:
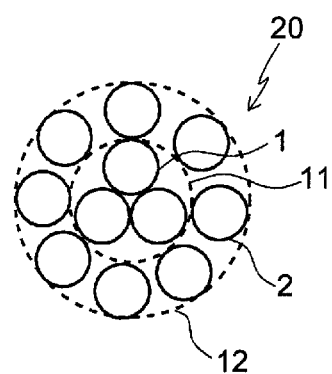
FIG. 3A is a cross-sectional view of a steel cord having a 1×3+8 structure prior to a cut input.
FIG. 3B is a cross-sectional view of a steel cord having a 1×3+8 structure when a cut input is made.
Figure 3:
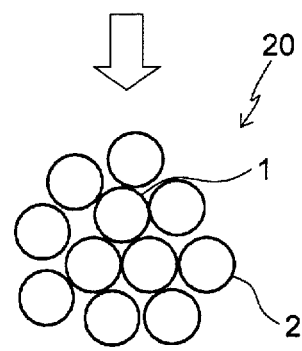

FIG. 2A is a cross-sectional view illustrating a tire steel cord prior to a cut input according to one preferred embodiment of the present invention, and FIG. 2B is a cross-sectional view illustrating the tire steel cord when a cut input is made according to one preferred embodiment of the present invention. FIG. 3A is a cross-sectional view of a steel cord having a 1×3+8 structure prior to a cut input, and FIG. 3B is a cross-sectional view of a steel cord having a 1×3+8 structure when a cut input is made. When a cut is input to the steel cord 20, in the steel cords 20 having the respective cross-sections illustrated in FIGS. 2A and 3A, the positions of the core filaments 1 and the sheath filaments 2 are changed as illustrated in FIGS. 2B and 3B, respectively. It is noted here that the arrows in FIGS. 2B and 3B each represent the direction of the cut input.

Comparing the FIGS. 2B and 3B, since the steel cord 20 having the core 11 composed of two core filaments 1 that are twisted together has large gaps in the core 11 as illustrated in FIG. 2B, the sheath filaments 2 sink into the gaps of the core 11 when a cut is input, so that the cross-section of the steel cord 20 can be deformed into a flat shape. Accordingly, the cut input can be mitigated and a high shear load is thereby attained. On the other hand, in the steel cord 20 having the core 11 in which three core filaments 1 are twisted together as illustrated in FIG. 3B, since there is no gap which the sheath filaments 2 can sink into when a cut is input, the cross-section of the steel cord 20 cannot be deformed into a flat shape even with the cut input. Accordingly, the cut input cannot be mitigated, and the shear load is relatively small. Similarly, in those cases of steel cords having one or four core filaments, the core has no gap for the sheath filaments to sink into. Therefore, in the steel cord 20 of the present invention, the core 11 is formed by twisting together two core filaments 1. Further, in order to allow the sheath filaments 2 to sink smoothly, it is preferred to use filaments having straightness as the core filaments 1 and the sheath filaments 2.

In the steel cord 20 of the present invention, the number of the sheath filaments 2 is 8. When the number of the sheath filaments 2 is less than 8, the shear load is reduced since the amount of steel per unit area of the steel cord is small. Meanwhile, when the number of the sheath filaments 2 is greater than 8, since the gaps between the sheath filaments 2 are small, the steel cord 20 cannot collapse into a flat shape, so that the shear load is reduced likewise. In addition, the small gaps between the sheath filaments 2 makes it difficult for a rubber to permeate thereinto, which is not preferred.

Further, in the steel cord 20 of the present invention, the twisting direction of the core filaments 1 is different from the twisting direction of the sheath filaments 2. This makes it easy for a rubber to infiltrate into the steel cord 20, and the corrosion resistance of the steel cord 20 is thereby improved. In addition, because of the difference in the twisting direction between the core filaments 1 and the sheath filaments 2, deformation of a treat prepared by rubber-coating the steel cord 20 that is caused by cutting of the treat can be suppressed, so that not only excellent workability in the production of a tire using the steel cord 20 of the present invention but also an effect of inhibiting crack propagation against strains applied from various directions can be attained.

Still further, in the steel cord 20 of the present invention, the diameter (Dc) of the core filaments 1 and the diameter (Ds) of the sheath filaments 2 satisfy a relationship represented by the following Equation (1):

$$0.90 \leq Ds/Dc \leq 1.10 \tag{1}$$

With the value of Ds/Dc satisfying this range, good rubber permeability into the steel cord 20 can be ensured, and sufficient cutting resistance and strength can be attained. In order to favorably attain this effect, the Ds and the Dc satisfy preferably:

$$0.95 \leq Ds/Dc \leq 1.08 \tag{4},$$

more preferably:

$$1.00 \leq Ds/Dc \leq 1.05 \tag{5},$$

and the Ds and Dc are particularly preferably the same (Ds=Dc).

Yet still further, in the steel cord 20 of the present invention, it is preferred that the diameter (Dc) of the core filaments 1 and the diameter (Ds) of the sheath filaments 2 be both 0.30 to 0.55 mm. By controlling the diameter (Dc) of the core filaments 1 and the diameter (Ds) of the sheath filaments 2 to be in this range, good rubber permeability into the steel cord 20 can be ensured likewise, and sufficient cutting resistance and strength can be attained. In order to favorably attain this effect, the diameter (Dc) and the diameter (Ds) are preferably 0.30 to 0.46 mm, more preferably 0.37 to 0.43 mm.

Yet still further, in the steel cord 20 of the present invention, it is preferred that the twisting pitch of the core filaments 1 be 5 to 15 mm. By controlling the twisting pitch of the core filaments 1 to be in this range, sufficient rubber permeability into the steel cord 20 can be attained. The twisting pitch of the core filaments 1 is more preferably 5 to 13 mm, still more preferably 7 to 9 mm.

Yet still further, in the steel cord 20 of the present invention, it is preferred that the twisting pitch of the sheath filaments 2 be preferably 9 to 30 mm. By controlling the twisting pitch of the sheath filaments 2 to be 9 mm or larger, the surface irregularities of the steel cord 20 can be reduced, as a result of which the adhesion between a rubber and the steel cord 20 is enhanced and the durability is thus improved. Meanwhile, when the twisting pitch of the sheath filaments 2 is large, spread of water along the sheath filaments 2 is accelerated. In order to inhibit this phenomenon, the twisting pitch of the sheath filaments 2 is preferably 30 mm or smaller, more preferably 9 to 26 mm, still more preferably 15 to 20 mm.

In the steel cord 20 of the present invention, it is preferred that the sum (S2) of the gap area (S1) of the sheath 12 and the cross-sectional areas of the sheath filaments 2 satisfy a relationship represented by the following Equation (2):

$$40 \leq S1/S2 \times 100(\%) \leq 120 \quad (2)$$

The "gap area (S1)" of the sheath 12 refers to the portion indicated with diagonal lines in FIG. 1. By controlling the value of S1/S2×100(%) to be 40 or larger, the gap area of the sheath 12 can be sufficiently ensured, and the steel cord 20 is made more likely to deform into a flat shape when a cut is input. In addition, since the gaps in the sheath 12 are increased, excellent rubber permeability is attained, so that a separation failure caused by corrosion of the steel cord 20 due to infiltration of water through a cut damage can be favorably inhibited. Meanwhile, by controlling the value of S1/S2×100(%) to be 120 or smaller, a certain amount of steel in the sheath 12 is ensured, and sufficient cutting resistance as a reinforcing material can thus be ensured.

The gap area (S1) of the sheath 12 can be determined by the following Equation (6):

$$S1 = (r_1 + r_2)^2 \pi - r_1^2 \pi - r_2^2 \pi \times N/4 \quad (6)$$

$r_1$: Diameter of core filaments
$r_2$: Diameter of sheath filaments
N: Number of sheath filaments In the steel cord 20 of the present invention, it is preferred that the gap area (S1) of the sheath 12 be 0.30 mm² or larger. The effects of the present invention can be favorably obtained by adjusting the diameter (Dc) of the core filaments 1 and the diameter (Ds) of the sheath filaments 2 such that the gap area (S1) of the sheath 12 is 0.30 mm² or larger.

In the steel cord 20 of the present invention, it is preferred that the strength (F1) of the core filaments 1 and the strength (F2) of the sheath filaments 2 satisfy a relationship represented by the following Equation (3):

$$F1/F2 \times 100 \geq 90(\%) \quad (3)$$

In pneumatic tires, a strength is also demanded for belt layers. When the strength is insufficient, the pneumatic tires cannot withstand an internal pressure and a load, and their burst durability is reduced. However, when thick steel filaments are used for improving the strength, the rubber permeability into the steel cord is deteriorated. Moreover, an increase in the strength of the steel filaments for the purpose of increasing the strength of the belt layers, the shear load is deteriorated. Therefore, in the steel cord 20 of the present invention, by satisfying the Equation (3), preferably by controlling the F1 and the F2 to be the same (F1=F2), such problems are avoided and the strength of the steel cord 20 is improved. The strength (F2) of the sheath filaments is preferably 150 N or greater and, taking into consideration the shear load, the upper limit of the F1 and F2 is 580 N or less.

In the steel cord 20 of the present invention, what is important are only the features that the steel cord 20 includes the core 11 composed of the two core filaments 1 twisted together and the sheath 12 composed of the eight sheath filaments 2 twisted together in the opposite direction of the core filaments 1 and that the diameter (Dc) of the core filaments 1 and the diameter (Ds) of the sheath filaments 2 satisfy 0.90≤Ds/Dc≤1.10, and the steel cord 20 of the present invention is not particularly restricted with regard to other features of the constitution.

The material of the steel filaments used in the steel cord 20 of the present invention is also not particularly restricted, and any conventionally used steel filaments can be used; however, the material is preferably a high-carbon steel containing not less than 0.80% by mass of a carbon component. By using a high-hardness high-carbon steel containing not less than 0.80% by mass of a carbon component as the material of the filaments, the effects of the present invention can be favorably attained. Meanwhile, a carbon component content of greater than 1.5% by mass is not preferred since the ductility is reduced and the fatigue resistance is thus deteriorated.

A plating treatment may be performed on the surface of the steel cord 20 of the present invention. The composition of the plating to be applied to the surface of the steel cord 20 is not particularly restricted; however, a brass plating composed of copper and zinc is preferred, and a brass plating having a copper content of not less than 60% by mass is more preferred. By the plating treatment, the adhesion between the steel filaments and a rubber can be improved.

Next, the pneumatic tire of the present invention will be described.

Figure 4:
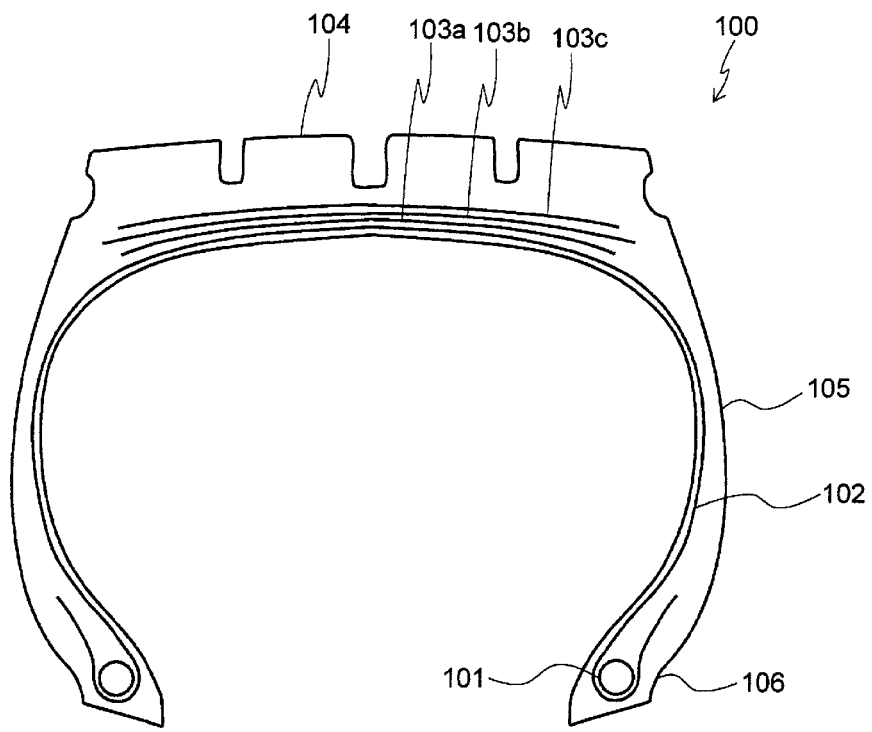
FIG. 4 is a widthwise cross-sectional view illustrating a pneumatic tire according to one embodiment of the present invention.

The pneumatic tire of the present invention includes the steel cord of the present invention. FIG. 4 is a widthwise cross-sectional view illustrating a pneumatic tire according to one embodiment of the present invention. In the illustrated example, a tire 100 of the present invention includes: bead cores 101 arranged in a pair of left and right bead portions 106; and a tread portion 104 that is reinforced by a radial carcass 102, which extends from a crown portion to both bead portions 106 through side wall portions 105 and is wound around the bead cores 101 and thereby anchored to the respective bead portions 106, and a belt which is arranged on the crown portion tire radial-direction outer side of the radial carcass 102 and constituted by at least three belt layers 103a, 103b and 103c. As described above, the steel cord of the present invention has excellent cutting resistance and is, therefore, suitable as a reinforcing material of a heavy-duty pneumatic tire of a dump truck or the like, particularly as a reinforcing material of the outermost belt layer 103c, the intersecting belt layers 103a and 103b, and a belt reinforcing layer (not illustrated) that is arranged on the tire radial-direction outer side of the outermost belt layer 103c; however, the use of the steel cord of the present invention is not restricted thereto.

In the tire 100 of the present invention, the details of the tire constitution, the materials of the respective members and the like are not particularly restricted, and the tire 100 of the present invention can be configured by appropriately selecting conventionally known structure, materials and the like. For example, a tread pattern is formed as appropriate on the surface of the tread portion 104, bead fillers (not illustrated) are arranged on the tire radial-direction outer side of the respective bead cores 101, and an inner liner is arranged as an innermost layer of the tire 100. Further, as a gas filled into the tire 100 of the present invention, air having normal or adjusted oxygen partial pressure, or an inert gas such as nitrogen, can be used.

EXAMPLES

The present invention will now be described in more detail by way of examples thereof.

Examples 1 to 17 and Comparative Examples 1 to 11

Double-layer twisted steel cords having the respective structures shown in Tables 1 to 5 below were prepared. The gap area (S1) of the sheath and the sum (S2) of the cross-sectional areas of the sheath filaments, as well as the value of S1/S2×100, the strength (F1) of the core filaments, the strength (F2) of the sheath filaments and the value of F1/F2×100 are all shown in the same Tables. The thus obtained steel cords were each evaluated for the below-described items. The evaluation methods were as follows.

<Cutting Resistance>

Figure 5:
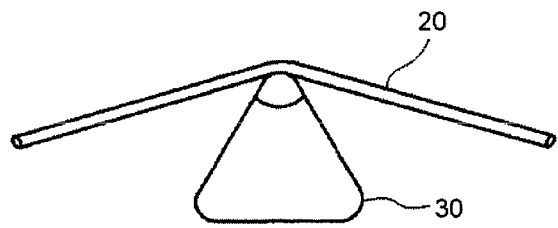
FIG. 5 is a schematic view illustrating a method of measuring the shear breaking strength of a steel cord.

The thus obtained steel cords were each maintained in a bent state at 165°, and a jig 30 illustrated in FIG. 5 was pressed against each steel cord to measure the breaking strength. The cutting resistance of each steel cord was calculated by dividing the thus measured breaking strength by the value of simple tensile strength that had been separately measured in accordance with a conventional method (shear strength/simple tensile strength). The results thereof were indicated as index values taking the value determined for the steel cord of Comparative Example 1 as 100. A larger value means a better result, and a value of 400 or larger was regarded as satisfactory. The thus obtained results are also shown in Tables 1 to 5.

<Rubber Penetration>

The steel cords shown in Tables 1 to 5 were each embedded in a rubber to prepare steel cord-reinforced rubber samples, and the rubber penetration was evaluated. After dissecting the thus obtained samples and taking the steel cords therefrom, one end of each steel cord was immersed in a 10% aqueous NaOH solution and left to stand for 24 hours, and the "detached rubber length" was subsequently measured. If the rubber permeated into the steel cord, detachment of the rubber would not occur. The inverse value of the "detached rubber length" was determined and indicated as an index taking the value determined for the steel cord of Comparative Example 1 as 100. A larger value means a better result, and a value of 500 or larger was regarded as satisfactory. The results thereof are also shown in Tables 1 to 5.

<Simple Tensile Strength/Cord Diameter>

The ratio of simple tensile strength/cord diameter was calculated by dividing the simple tensile strength of each steel cord measured in accordance with a conventional method by the diameter of the steel cord. A value of 1,800 N/mm or larger was regarded as satisfactory. The results thereof are also shown in Tables 1 to 5.

<Tread Separation Resistance>

Tires of the type illustrated in FIG. 4 in which each of the thus obtained steel cords was applied as an outermost belt layer were produced at a tire size of 11R22.5/14PR. The angle of the outermost belt layer was set at ±20°, and the end count was set at 25 cords/50 mm. The thus obtained tires were each mounted on a rim having a size of 8.25 inches and then subjected to a 500-hour drum running test at an air pressure of 700 kPa, a load of 26.7 kN and a speed of 60 km/h. After the completion of the drum running test, each tire was cut and disassembled, and the length of a crack generated in the outermost belt layer was measured and indicated as an index based on Comparative Example 1. A larger value means superior tread separation resistance, and a value of 50 or larger was regarded as satisfactory. The results thereof are also shown in Tables 1 to 5.

<Processability in Plant>

In the process of cutting a treat prepared using each steel cord, an evaluation of "x" was given when an end of the treat warped and largely curled up to such an extent that the workability was deteriorated, while an evaluation of "○" was given when the curling was small and did not affect the workability. The results thereof are also shown in Tables 1 to 5.

TABLE 1

|  |  | Comparative Example 1 | Example 1 | Example 2 | Example 3 | Example 4 | Comparative Example 2 |
|---|---|---|---|---|---|---|---|
| Core | Number of filaments | 2 | 2 | 2 | 2 | 2 | 4 |
|  | Filament diameter Dc (mm) | 0.4 | 0.4 | 0.4 | 0.3 | 0.55 | 0.4 |
|  | Filament strength F1 (N) | 346 | 346 | 346 | 240 | 568 | 346 |
|  | Filament twisting direction | — | Z | S | Z | Z | Z |
|  | Twisting pitch (mm) | — | 8 | 8 | 8 | 8 | 8 |

TABLE 1-continued

|  |  | Comparative Example 1 | Example 1 | Example 2 | Example 3 | Example 4 | Comparative Example 2 |
|---|---|---|---|---|---|---|---|
| Sheath | Number of filaments | 8 | 8 | 8 | 8 | 8 | 8 |
|  | Filament diameter Ds (mm) | 0.4 | 0.4 | 0.4 | 0.3 | 0.55 | 0.4 |
|  | Filament strength F2 (N) | 346 | 346 | 346 | 240 | 568 | 346 |
|  | Filament twisting direction | S | S | Z | S | S | S |
|  | Twisting pitch (mm) | 17 | 17 | 17 | 17 | 17 | 17 |
| Core-sheath filament twisting direction | | — | different | different | different | different | different |
| Ds/Dc | | 1.0 | 1.0 | 1.0 | 1.0 | 1.0 | 1.0 |
| S1 (mm$^2$) | | 0.32 | 0.50 | 0.50 | 0.28 | 0.95 | 0.71 |
| S2 (mm$^2$) | | 1.01 | 1.01 | 1.01 | 0.57 | 1.90 | 1.01 |
| S1/S2 × 100 (%) | | 31.8 | 50.0 | 50.0 | 50.0 | 50.0 | 70.7 |
| F1/F2 × 100 (%) | | 100 | 100 | 100 | 100 | 100 | 100 |
| Cutting resistance (index) | | 100 | 662 | 662 | 691 | 632 | 248 |
| Rubber penetration (index) | | 100 | 1,600 | 1,600 | 1,333 | 1,600 | 80 |
| Simple tensile strength/cord diameter (N/mm) | | 2,060 | 1,960 | 1,960 | 1,810 | 2,340 | 2,130 |
| Tread separation resistance (index) | | 100 | 100 | 100 | 90 | 100 | 100 |
| Processability in plant | | ○ | ○ | ○ | ○ | ○ | ○ |

TABLE 2

|  |  | Comparative Example 3 | Comparative Example 4 | Comparative Example 5 | Comparative Example 6 | Comparative Example 7 | Example 5 |
|---|---|---|---|---|---|---|---|
| Core | Number of filaments | 3 | 2 | 2 | 2 | 2 | 2 |
|  | Filament diameter Dc (mm) | 0.4 | 0.4 | 0.4 | 0.4 | 0.4 | 0.44 |
|  | Filament strength F1 (N) | 346 | 346 | 346 | 346 | 346 | 401 |
|  | Filament twisting direction | Z | Z | Z | Z | S | Z |
|  | Twisting pitch (mm) | 8 | 8 | 8 | 8 | 8 | 8 |
| Sheath | Number of filaments | 8 | 7 | 9 | 8 | 8 | 8 |
|  | Filament diameter Ds (mm) | 0.4 | 0.4 | 0.4 | 0.4 | 0.4 | 0.4 |
|  | Filament strength F2 (N) | 346 | 346 | 346 | 346 | 346 | 346 |
|  | Filament twisting direction | S | S | S | Z | S | S |
|  | Twisting pitch (mm) | 17 | 17 | 17 | 17 | 17 | 17 |
| Core-sheath filament twisting direction | | different | different | different | same | same | different |
| Ds/Dc | | 1.0 | 1.0 | 1.0 | 1.0 | 1.0 | 0.91 |
| S1 (mm$^2$) | | 0.58 | 0.63 | 0.38 | 0.50 | 0.50 | 0.60 |
| S2 (mm$^2$) | | 1.01 | 0.88 | 1.13 | 1.01 | 1.01 | 1.01 |

TABLE 2-continued

|  | Comparative Example 3 | Comparative Example 4 | Comparative Example 5 | Comparative Example 6 | Comparative Example 7 | Example 5 |
|---|---|---|---|---|---|---|
| S1/S2 × 100 (%) | 57.7 | 71.4 | 33.3 | 50.0 | 50.0 | 60.0 |
| F1/F2 × 100 (%) | 100 | 100 | 100 | 100 | 100 | 116 |
| Cutting resistance (index) | 248 | 496 | 414 | 721 | 721 | 453 |
| Rubber penetration (index) | 80 | 800 | 80 | 800 | 800 | 1,600 |
| Simple tensile strength/cord diameter (N/mm) | 2,080 | 1,760 | 2,160 | 2,090 | 2,090 | 1,930 |
| Tread separation resistance (index) | 100 | 100 | 100 | 100 | 100 | 100 |
| Processability in plant | ○ | ○ | ○ | x | x | ○ |

TABLE 3

|  |  | Example 6 | Comparative Example 8 | Comparative Example 9 | Example 7 | Example 8 | Comparative Example 10 |
|---|---|---|---|---|---|---|---|
| Core | Number of filaments | 2 | 2 | 2 | 2 | 2 | 2 |
|  | Filament diameter Dc (mm) | 0.4 | 0.47 | 0.4 | 0.4 | 0.37 | 0.4 |
|  | Filament strength F1 (N) | 346 | 439 | 346 | 346 | 315 | 346 |
|  | Filament twisting direction | Z | Z | Z | Z | Z | Z |
|  | Twisting pitch (mm) | 8 | 8 | 8 | 8 | 8 | 8 |
| Sheath | Number of filaments | 8 | 8 | 8 | 8 | 8 | 8 |
|  | Filament diameter Ds (mm) | 0.44 | 0.4 | 0.45 | 0.37 | 0.4 | 0.34 |
|  | Filament strength F2 (N) | 401 | 346 | 413 | 315 | 346 | 279 |
|  | Filament twisting direction | S | S | S | S | S | S |
|  | Twisting pitch (mm) | 17 | 17 | 17 | 17 | 17 | 17 |
| Core-sheath filament twisting direction |  | different | different | different | different | different | different |
| Ds/Dc |  | 1.10 | 0.85 | 1.13 | 0.93 | 1.08 | 0.85 |
| S1 (mm$^2$) |  | 0.50 | 0.68 | 0.49 | 0.50 | 0.43 | 0.49 |
| S2 (mm$^2$) |  | 1.22 | 1.01 | 1.27 | 0.86 | 1.01 | 0.73 |
| S1/S2 × 100 (%) |  | 40.9 | 67.5 | 38.9 | 58.1 | 42.5 | 67.6 |
| F1/F2 × 100 (%) |  | 86 | 127 | 84 | 110 | 91 | 124 |
| Cutting resistance (index) |  | 453 | 439 | 439 | 453 | 453 | 439 |
| Rubber penetration (index) |  | 1,000 | 1,600 | 100 | 1,600 | 1,000 | 1,600 |
| Simple tensile strength/cord diameter (N/mm) |  | 2,100 | 1,780 | 2,130 | 1,890 | 2,000 | 1,790 |
| Tread separation resistance (index) |  | 100 | 100 | 100 | 100 | 100 | 100 |
| Processability in plant |  | ○ | ○ | ○ | ○ | ○ | ○ |

TABLE 4

| | | Comparative Example 11 | Example 9 | Example 10 | Example 11 | Example 12 | Example 13 |
|---|---|---|---|---|---|---|---|
| Core | Number of filaments | 2 | 2 | 2 | 2 | 2 | 2 |
| | Filament diameter Dc (mm) | 0.34 | 0.4 | 0.4 | 0.4 | 0.4 | 0.4 |
| | Filament strength F1 (N) | 279 | 346 | 346 | 346 | 346 | 346 |
| | Filament twisting direction | Z | Z | Z | Z | Z | Z |
| | Twisting pitch (mm) | 8 | 5 | 15 | 4 | 16 | 5 |
| Sheath | Number of filaments | 8 | 8 | 8 | 8 | 8 | 8 |
| | Filament diameter Ds (mm) | 0.4 | 0.4 | 0.4 | 0.4 | 0.4 | 0.4 |
| | Filament strength F2 (N) | 346 | 346 | 346 | 346 | 346 | 346 |
| | Filament twisting direction | S | S | S | S | S | S |
| | Twisting pitch (mm) | 17 | 17 | 17 | 17 | 17 | 9 |
| Core-sheath filament twisting direction | | different | different | different | different | different | different |
| Ds/Dc | | 1.18 | 1.0 | 1.0 | 1.0 | 1.0 | 1.0 |
| S1 (mm$^2$) | | 0.35 | 0.50 | 0.50 | 0.50 | 0.50 | 0.50 |
| S2 (mm$^2$) | | 1.01 | 1.01 | 1.01 | 1.01 | 1.01 | 1.01 |
| S1/S2 × 100 (%) | | 35.0 | 50.0 | 50.0 | 50.0 | 50.0 | 50.0 |
| F1/F2 × 100 (%) | | 81 | 100 | 100 | 100 | 100 | 100 |
| Cutting resistance (index) | | 439 | 632 | 691 | 617 | 694 | 617 |
| Rubber penetration (index) | | 100 | 1,600 | 1,333 | 1,600 | 1,000 | 1,600 |
| Simple tensile strength/cord diameter (N/mm) | | 2,040 | 1,940 | 1,980 | 1,940 | 1,980 | 1,910 |
| Tread separation resistance (index) | | 100 | 100 | 100 | 100 | 100 | 80 |
| Processability in plant | | ○ | ○ | ○ | ○ | ○ | ○ |

TABLE 5

| | | Example 14 | Example 15 | Example 16 | Example 17 |
|---|---|---|---|---|---|
| Core | Number of filaments | 2 | 2 | 2 | 2 |
| | Filament diameter Dc (mm) | 0.4 | 0.4 | 0.4 | 0.4 |
| | Filament strength F1 (N) | 346 | 346 | 346 | 320 |
| | Filament twisting direction | Z | Z | Z | Z |
| | Twisting pitch (mm) | 5 | 5 | 5 | 8 |
| Sheath | Number of filaments | 8 | 8 | 8 | 8 |
| | Filament diameter Ds (mm) | 0.4 | 0.4 | 0.4 | 0.4 |
| | Filament strength F2 (N) | 346 | 346 | 346 | 320 |
| | Filament twisting direction | S | S | S | S |
| | Twisting pitch (mm) | 30 | 8 | 31 | 17 |
| Core-sheath filament twisting direction | | different | different | different | different |
| Ds/Dc | | 1.0 | 1.0 | 1.0 | 1.0 |
| S1 (mm$^2$) | | 0.50 | 0.50 | 0.50 | 0.50 |
| S2 (mm$^2$) | | 1.01 | 1.01 | 1.01 | 1.01 |
| S1/S2 × 100(%) | | 50.0 | 50.0 | 50.0 | 50.0 |
| F1/F2 × 100(%) | | 100 | 100 | 100 | 100 |
| Cutting resistance (index) | | 647 | 610 | 648 | 662 |
| Rubber penetration (index) | | 1,333 | 1,600 | 1,000 | 1,600 |
| Simple tensile strength/cord diameter (N/mm) | | 2,010 | 1,910 | 2,010 | 1,810 |
| Tread separation resistance (index) | | 100 | 80 | 100 | 100 |
| Processability in plant | | ○ | ○ | ○ | ○ |

From Tables 1 to 5, it is seen that the steel cord of the present invention has not only excellent cutting resistance and corrosion resistance but also excellent processability in plant.

DESCRIPTION OF SYMBOLS

1: core filament
2: sheath filament
11: core
12: sheath
20: steel cord
30: jig
100: pneumatic tire
101: bead core
102: radial carcass
103: belt layer
104: tread portion
105: side wall portion

The invention claimed is:

1. A tire steel cord having a layer-twisted structure comprising:
 a core consisting of two core filaments; and
 a sheath consisting of eight sheath filaments that are twisted together around the core,
 wherein
 the two core filaments constituting the core are twisted together, the twisting direction of the core filaments and that of the sheath filaments are different,
 the twisting pitch of the sheath filaments is 15 to 30 mm, and
 a diameter (Dc) of the core filaments and a diameter (Ds) of the sheath filaments satisfy a relationship represented by the following Equation (1):

$$0.90 \leq Ds/Dc \leq 1.10 \tag{1}$$

2. The tire steel cord according to claim 1, wherein the Dc and the Ds are the same.

3. The tire steel cord according to claim 1, wherein the Dc and the Ds are both 0.30 to 0.55 mm.

4. The tire steel cord according to claim 2, wherein the Dc and the Ds are both 0.30 to 0.55 mm.

5. The tire steel cord according to claim 1, wherein the twisting pitch of the core filaments is 5 to 15 mm.

6. The tire steel cord according to claim 1, wherein a gap area (S1) of the sheath and a sum (S2) of cross-sectional areas of the sheath filaments satisfy a relationship represented by the following Equation (2):

$$40 \leq S1/S2 \times 100(\%) \leq 120 \tag{2}$$

7. The tire steel cord according to claim 1, wherein a gap area (S1) of the sheath is 0.30 mm$^2$ or larger.

8. The tire steel cord according to claim 1, wherein a strength (F1) of the core filaments and a strength (F2) of the sheath filaments satisfy a relationship represented by the following Equation (3):

$$F1/F2 \times 100 \geq 90(\%) \tag{3}$$

9. The tire steel cord according to claim 1, wherein a strength (F2) of the sheath filaments is 150 N or higher.

10. A pneumatic tire comprising the tire steel cord according to claim 1.

11. A pneumatic tire comprising the tire steel cord according to claim 2.

12. A pneumatic tire comprising the tire steel cord according to claim 3.

13. A pneumatic tire comprising the tire steel cord according to claim 4.

14. A pneumatic tire comprising the tire steel cord according to claim 5.

15. A pneumatic tire comprising the tire steel cord according to claim 6.

16. A pneumatic tire comprising the tire steel cord according to claim 7.

17. A pneumatic tire comprising the tire steel cord according to claim 8.

18. A pneumatic tire comprising the tire steel cord according to claim 9.

19. The pneumatic tire according to claim 10, wherein the tire steel cord is applied as at least one of a reinforcing material of an outermost belt layer, an intersecting belt layer, or a belt reinforcing layer.

* * * * *